Dec. 6, 1966    D. HATCH ETAL    3,290,423
MANUFACTURE OF FRICTION DISCS
Filed Nov. 13, 1962    2 Sheets-Sheet 1

Inventors
Donald Hatch
Peter Gordon Mellor
By
Bailey, Stephens & Huettig
Attorneys

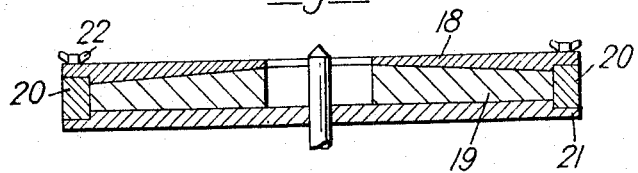
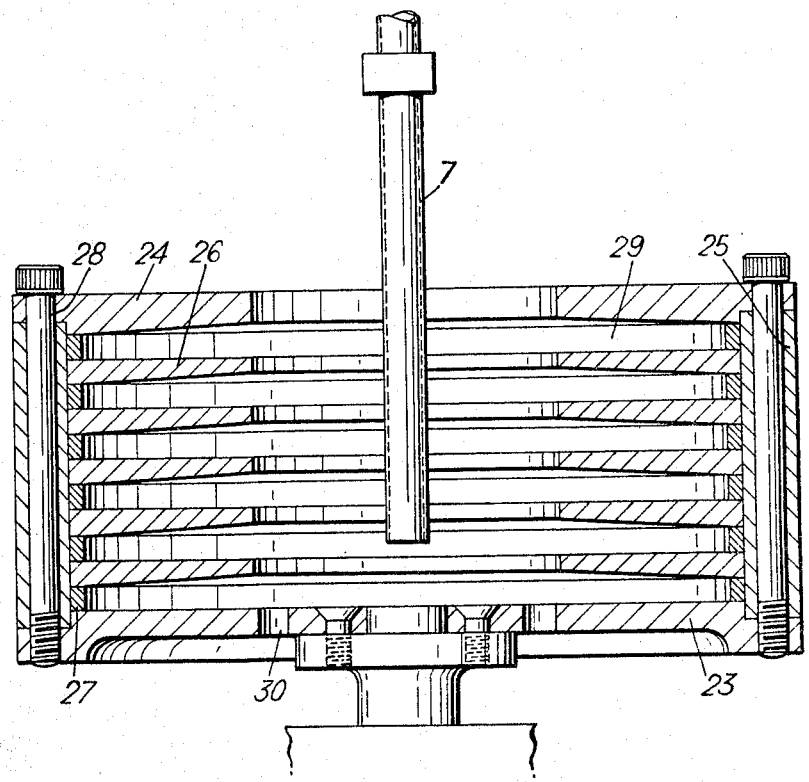

3,290,423
MANUFACTURE OF FRICTION DISCS
Donald Hatch and Peter Gordon Mellor, Stockport, England, assignors to Ferodo Limited, Manchester, England, a British company
Filed Nov. 13, 1962, Ser. No. 237,034
Claims priority, application Great Britain, Nov. 17, 1961, 41,326/61
3 Claims. (Cl. 264—294)

This invention relates to the manufacture of friction discs and is particularly applicable to the manufacture of clutch facings. These are commonly made from fibres and a binding agent, with or without other ingredients. The fibres most commonly used are asbestos, but other non-metallic inorganic fibres may be used, and there may also be some organic fibres such as cotton and some short metal fibres. The other ingredients may include metallic powders, mineral fillers, cured resin or rubber powders, graphite and lubricants. The binding agents most commonly used are thermosetting resins, but rubber is sometimes used as a binding agent and the ingredients then normally include rubber-curing ingredients and anti-oxidants.

In the manufacture of such discs the first step is the production of a blank in the "green" state, and then this blank is cured under heat and pressure. After the curing the discs are generally baked in order to improve their friction characteristics. In one common method the ingredients are compounded together, and the mixture is formed into the blank in a press. In another method, which is occasionally used, the blank is formed from the fibres with a small amount of a bonding agent, adequate to give the blank enough strength in the green state to be handled, and then the blank is impregnated with the binding agent proper by absorption of a solution of the binding agent in a solvent. In these methods the orientation of the fibres is always substantially random.

In another common method of fibres are present in the blank as asbestos paper, yarn, cloth or braid, which are impregnated with a mixture of the other ingredients and spirally wound. This method presents the advantage that because the fibres extend essentially circumferentially the bursting strength of the product, i.e. its capacity for resisting centrifugal force, is high, but it presents the disadvantage that the fibres must be carded and spun into yarn or the like.

According to the invention, the solid ingredients of a blank, while suspended in a liquid phase, are fed into a mould having a central opening and an annular cavity while the mould is rotating at a speed so high that the solid ingredients separate from the liquid phase under centrifugal action and fill the cavity. The resultant blank may be converted into a friction disc by the usual steps described above, which of course are dependent on the exact composition. Drying at a relatively low temperature before the curing is normally desirable. Any machining required to reduce the disc to the desired final dimensions may be carried out as a final step as usual.

In the resultant discs the fibres are essentially circumferentially oriented, with the advantage that the bursting strength is similar to, and surprisingly may even be substantially higher than, that of discs made from yarn or the like. This advantageous result is obtained with the use of short fibres. The invention includes, as a novel product, an annular friction disc composed of unwoven non-metallic inorganic short fibres and a binding agent with or without other ingredients and with or without other fibres, the fibres being essentially circumferentially oriented.

In the use of a friction disc the torque at any given radius is the product of the radius and the frictional force at that radius. If this force is constant the torque contribution from different parts of the disc will thus vary radially. Now in the process according to the invention the disc may be considered to be formed of circular laminae, each deposited under centrifugal force, this force decreasing as the radius of the lamina decreases. The result is that the disc is denser at the periphery than at the inner surface. This may be an advantageous feature since in general the coefficient of friction increases as the density decreases.

It is however found that the radial variation in density that results from the use of a mould cavity of uniform depth is too great. A further feature of the invention consists in making the mould cavity increase in depth from the outer periphery inwards, so that the resultant blank diminishes in thickness radially outwards. This blank is subsequently compressed to uniform thickness with consequent increase in density towards the inner edge, i.e. with partial or, if desired, complete compensation for the decrease in centrifugal force from the outside inwards. Thus by the process according to the invention it is possible to obtain substantially uniform torque over the radial width of the disc and hence substantially uniform rate of wear. Other desirable types of radial change in torque may be produced at will.

The solid ingredients of the disc may broadly be any of those used in the manufacture of conventional discs, and may consist of from 40 to 99% fibre, 1 to 35% binding agent and 0 to 40% other ingredients, all by weight. However, the invention is particularly useful in the manufacture of discs from asbestos fibres with or without other fibres, a binding agent and other ingredients, and the mixture of the solid ingredients may advantageously consist (by weight) of from 40 to 75% fibres, from 15 to 35% binding agent and from 15 to 35% other ingredients. In this mixture the asbestos fibres should predominate but a small proportion of the fibres may be of glass or cotton or both. Very good discs may be made with from 45 to 60% short asbestos fibres, say of average length of from 1 to 3 mm., and from 20 to 30% thermosetting resin as a binder, the remainder being conventional powder ingredients.

The invention may be applied also to the production of green blanks which are impregnated with the binding agent proper. In this case the fibres are suspended in the liquid phase and a small proportion of an agent which bonds them into the blank is added to the liquid phase; for instance the blank may consist of 99% fibre and 1% starch by weight and it may then be impregnated with a solution of a thermosetting resin in a solvent. The discs made in this way may contain from 70 to 85% fibres and 15 to 30% binding agent.

The liquid phase is normally water. It will be appreciated that since the process depends on the separation of the solid ingredients from the liquid by centrifugal force, there must be adequate difference in specific gravity between the liquid and every solid ingredient, and if it is desired to include any solid ingredient of specific gravity less than 1 either a liquid of lower specific gravity must be used or such an ingredient must be bonded to a heavier one in a preliminary operation. Naturally the liquid must be one which will not chemically attack or dissolve any of the solid ingredients.

The preferred form of mould for use in carrying out the method constitutes one feature of the invention, and is formed by a circular plate carried by a shaft, a detachable annular plate open at the centre to receive the suspension and a circular distance piece between the two plates, the distance piece forming the outer wall of an annular mould cavity that is open around the whole of its inner surface.

In the accompanying drawings:

FIGURE 1 diagrammatically shows an apparatus for use in the manufacture of discs according to the invention;

FIGURE 3 shows somewhat diagrammatically a modified form of mould; and

FIGURE 4 is a central section through yet another mould.

Figure 1:
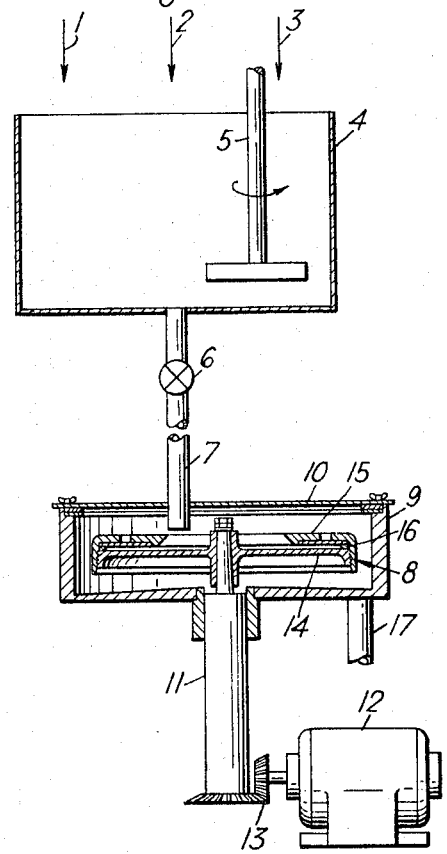

In the apparatus shown in FIGURE 1 the solid ingredients, composed of fibers and a binding agent, and water are fed in measured amounts, as diagrammatically shown at 1, 2 and 3, into a vessel 4 containing an eccentrically mounted stirrer 5 in which the solid ingredients and water are converted into a substantially uniform slurry. By opening a valve 6 in a flexible discharge pipe 7 the amount of slurry required to form one disc can be discharged under gravity immediately above the open centre of a mould 8. This mould 8 is mounted to rotate about a vertical axis within a casing 9 having an easily removable cover 10 through which the pipe 7 passes. The mould is carried by a vertical shaft 11 which passes through the bottom of the casing 9 and can be rotated at high speed by a motor 12 through gearing 13. A brake (not shown) is provided so that the motor and mould can rapidly be brought to rest at the end of each operation.

The mould consists of a circular plate 14 fixed to the shaft 11 and an easily detachable annular cover plate 15, which as shown in FIGURE 1 screws over the edge of the circular plate 14. The depth of the mould cavity is adjusted to give the required thickness of the finished disc by an annular distance piece 16 in the form of a metal ring which also provides the periphery against which the edge of the disc is formed.

To facilitate opening of the mould holes 31 for the reception of tools are provided, and are closed at their undersides by a plate 32 that is let into the plate 8.

In operation the slurry enters through the pipe 7 in the manner shown by arrows A and flows into the mould cavity, and the water separated from the solid ingredients escapes through the open centre of the mould in the manner shown by arrows B and flows over the top of the mould into the casing 9, from which it flows through a pipe 17 to a collecting tank.

In the modified and preferred mould illustrated diagrammatically in FIGURE 3 a cover plate 18 tapering in thickness radially is used to provide a mould cavity whose radial cross-section decreases in depth from the inner edge outwards, with the result that the blank 19 formed in the cavity diminishes in thickness outwards. A typical ratio of the depths at the inner and outer radii is 1.15:1. In this mould a distance piece 20 resting on the edge of a stepped mould plate 21 and thus located in position is used as the anchorage for the cover 18, and is held by fastening bolts 22.

Two or more blanks may be produced in one operation by feeding the mixture to two or more annular cavities in a single mould structure. Such a mould structure is shown in FIGURE 4, and comprises a bottom plate 23, a cover plate 24, a cylindrical wall 25 separating these, and a series of annular plates 26 separated from one another and from the cover plate 24 and bottom plate 23 by spacers 27. The whole assembly is held together by fixing bolts 28. It will be seen that a number of annular cavities 29 are produced by this structure. A feed pipe 7 is provided as before, and may be raised during the operation as successive cavities 29 become filled. It is in any case lifted and swung clear of the mould structure when all the blanks have been formed and are to be removed. Small drainage holes 30 are provided to allow excess slurry and liquid to drain out of the mould when this ceases to rotate.

Suitable speeds of rotation are from 2,500 to 10,000 r.p.m.

As an example of the production of one clutch facing according to the invention, the solids consisted of the following ingredients, in parts by weight:

Powdered thermosetting phenol formaldehyde resin __ 20
Asbestos fibre _____ 50
Powdered and cured resin of cashew nut shell liquid __ 17
Barytes _____ 13

Figure 2:
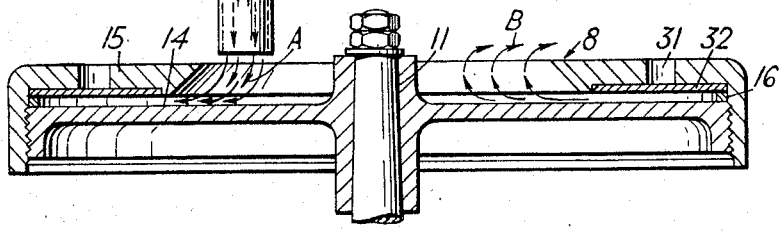
FIGURE 2 is a central section on a larger scale through the mould in this apparatus.

1 part by weight of a mixture of these ingredients was formed into a slurry with 35 parts by weight of water and fed into a mould as shown in FIGURE 2 rotating at a speed of 7,000 r.p.m. The filling of the mould cavity took 30 seconds. The green disc thus formed was then allowed to dry at a temperature of 50° C. overnight, and was cured in a mould at 150° C. under a pressure of 1 ton per sq. inch for five minutes. Thereafter it was baked for two hours at 200° C. The bursting strength of the resultant clutch facing was excellent.

Various modifications may be made. For example the mould may rotate about a horizontal axis instead of about a vertical axis as shown. The slurry may be forcibly fed through the feed pipe instead of flowing under gravity. There may be two or more feed pipes arranged with the centres of their mouths equally spaced apart around the mould, so that when the slurry enters the mould the balance of the mould at high speed is not disturbed.

The mould cavity need not have a circular periphery. For instance if the blanks are to be cured under pressure in a mould designed to produce gear teeth around the circumference, the mould cavity may have an undulating periphery corresponding to the gear teeth required, so that the amount of deformation of the blank in the press-mould required to produce the tooth form is reduced. It is a further advantage of the invention that in such a disc with gear teeth the flow of the material to the tooth form results in re-orientation of the fibres to give excellent strength at the roots of the teeth.

Further advantages of the invention are that the thickness of the disc is accurately controlled, and the laminated fibre structure provides paths through which gases liberated during the curing and baking may easily escape towards either main face by diffusion.

We claim:

1. A method of manufacturing a blank for an annular friction disc from solid ingredients that include fibres and a binding agent comprising the steps of suspending the solid ingredients of the blank in a liquid phase, rotating at high speed a mould having a central opening and an annular cavity whose radial cross-section decreases in depth from the inner edge outwards, feeding the suspension through the opening into the cavity, whereby solid ingredients separate from the liquid phase under centrifugal action and fill the cavity to form a blank diminishing in thickness radially outwards while the liquid escapes through said central opening, and subsequently compressing the blank to uniform thickness to produce a blank of uniform density.

2. A method as in claim 1, said solid ingredients comprising a by weight mixture of from 40 to 70% predominately asbestos fibers, from 15 to 35% binding agent and from 15 to 35% powder ingredients, and said liquid phase comprising water.

3. A method as in claim 1, said solid ingredients comprising by weight a mixture of from 45 to 60% short asbestos fibers, 20 to 30% of thermosetting resin, and the remainder of powdered ingredients.

References Cited by the Examiner

UNITED STATES PATENTS

| | | | |
|---|---|---|---|
| 2,033,923 | 3/1926 | Collier | 264—108 |
| 2,452,284 | 10/1948 | Beare | 264—324 |
| 2,847,707 | 1/1956 | Sullivan | 18—26 |
| 2,993,235 | 7/1961 | Brown et al. | 264—114 |
| 3,046,170 | 7/1962 | Toulmin | 161—170 |
| 3,074,834 | 1/1963 | Matlin et al. | 161—170 |
| 3,099,044 | 7/1963 | Reuter | 18—26 |

FOREIGN PATENTS 349,581  5/1931  Great Britain.

ROBERT F. WHITE, *Primary Examiner.*

ALEXANDER WYMAN, ALEXANDER H. BRODMERKEL, *Examiners.*

R. A. FLORES, S. A. HELLER, *Assistant Examiners.*